(12) United States Patent
Davies et al.

(10) Patent No.: US 7,400,653 B2
(45) Date of Patent: Jul. 15, 2008

(54) MAINTAINING SYNCHRONIZATION OF STREAMING AUDIO AND VIDEO USING INTERNET PROTOCOL

(75) Inventors: Trevor Davies, Walnut Creek, CA (US); John David Couling, Wootton Bassett (GB); Gopi Lakshminarayanan, Fremont, CA (US); Martin John Richards, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 974 days.

(21) Appl. No.: 10/871,363

(22) Filed: Jun. 18, 2004

(65) Prior Publication Data

US 2005/0281255 A1    Dec. 22, 2005

(51) Int. Cl.
*H04J 3/06*    (2006.01)
(52) U.S. Cl. .................. 370/493; 370/503; 370/536; 386/98
(58) Field of Classification Search ......... 370/503–521, 370/493–495, 395.64, 389, 392–394, 412, 370/428, 429, 474, 535, 536, 541, 542; 713/375, 713/400, 401, 500–503, 600, 601; 709/248; 375/354–371, 240.28; 348/423.1, 515; 386/39, 386/95, 98, 101; 714/12, 707, 713, 744, 714/775, 798; 704/200.1
See application file for complete search history.

(56) References Cited

U.S. PATENT DOCUMENTS

| | | | |
|---|---|---|---|
| RE33,535 E | 2/1991 | Cooper | |
| 5,430,485 A | 7/1995 | Lankford et al. | |
| 5,467,139 A | 11/1995 | Lankford | |
| 5,598,352 A | 1/1997 | Rosenau et al. | |
| 5,668,601 A | 9/1997 | Okada et al. | |
| 5,793,431 A | 8/1998 | Blanchard | |
| 5,815,634 A | 9/1998 | Daum et al. | |
| 5,949,410 A | 9/1999 | Fung | |
| 5,959,684 A | 9/1999 | Tan et al. | |
| 6,018,376 A | 1/2000 | Nakatani | |
| 6,122,668 A | 9/2000 | Teng et al. | |
| 6,130,987 A | 10/2000 | Tanaka | |
| 6,148,135 A * | 11/2000 | Suzuki | 386/98 |
| 6,262,776 B1 | 7/2001 | Griffits | |
| 6,269,122 B1 | 7/2001 | Prasad et al. | |
| 6,512,884 B1 | 1/2003 | Sawada | |
| 6,583,821 B1 | 6/2003 | Durand | |
| 6,661,430 B1 | 12/2003 | Brewer et al. | |
| 6,697,121 B2 | 2/2004 | Wang | |

(Continued)

*Primary Examiner*—Doris To
*Assistant Examiner*—Ian N. Moore
(74) *Attorney, Agent, or Firm*—Gallagher & Lathrop P.C.; David N. Lathrop

(57) ABSTRACT

A playback system in a digital cinema network synchronizes the presentation of visual and aural content by deriving timing information for packets of information that are conveyed in video and audio data streams, examining the timing information to determine if any misalignment between the two data streams is likely to be perceptible and, if the misalignment is deemed to be perceptible, introducing delays into one or both data streams to correct the misalignment. If the audio data stream precedes the video data stream, the audio data stream is delayed by an integer number of audio sample periods. If the video data stream precedes the audio data stream, the video data stream is delayed by an integer number of video frames and the audio data stream is delayed by an integer number of audio sample periods.

14 Claims, 2 Drawing Sheets

U.S. PATENT DOCUMENTS 6,744,815 B1 6/2004 Sackstein et al.
6,975,774 B2 * 12/2005 Ferguson ............. 348/E17.003

2003/0198256 A1 10/2003 Wang et al.
2004/0041946 A1 3/2004 Gries et al.

* cited by examiner

MAINTAINING SYNCHRONIZATION OF STREAMING AUDIO AND VIDEO USING INTERNET PROTOCOL

TECHNICAL FIELD

The present invention pertains generally to digital cinema playback systems and pertains more specifically to methods and devices for synchronizing audio and video content of digital cinematic presentations during playback.

BACKGROUND ART

The concept of "digital cinema" includes the production, delivery and presentation of aural/visual material in auditoriums or theatres using digital technology. Digital cinema programs typically are distributed in a compressed and encrypted form on physical media such as DVD-ROM, tape or computer hard drives and can in principle be distributed by electronic transmission using satellite or other broadband communication paths.

Digital cinema playback systems control the processes required to make a digital cinematic presentation. These processes include receiving and storing the digital cinema program, decompressing and deciphering it into digital video and audio data streams that can be processed by digital content decoders, decoding the content of the data streams to obtain signals that may be used drive video displays and audio amplifiers, and controlling other facilities such as curtains or theatre lighting that are found in a theatre auditorium.

For a variety of business reasons it is necessary to convey and process video and audio content in separate data streams. For example, video data for one presentation may be distributed with multiple sets of audio data having different languages or differences in vulgarity of speech that affect the maturity rating of the presentation. At playback time, the appropriate audio data can be selected for presentation with the video data. The video data selected audio data are conveyed in independent streams to equipment for processing such as content decoding.

Typical digital cinema playback systems include several pieces of equipment that communicate with one another through an electrical network that is similar to many networks that are used to interconnect computers. These networks often conform to a standard that is commonly known as Ethernet, which is described in the IEEE 802.3 standard, using a communication protocol known as the Transmission Control Protocol/Internet Protocol (TCP/IP). This choice of network and protocol can simplify the task of implementing a digital cinema playback system because the electrical and logical interfaces and procedures needed to use them are readily available and have relatively low cost. Unfortunately, the use of this type of network and protocol makes it difficult to synchronize the processing and presentation of the video and audio data streams.

A lack of synchronization between the video and audio data streams can introduce differences in the timing of events in the video and audio content that are intended to occur simultaneously. If the difference in timing is great enough, the result can be distracting to a viewer. Synchronization errors may be caused by timing errors in a playback systems or they may be caused by errors in control information conveyed within the video and audio data streams that control the operation of the playback systems. Control information errors may arise from a variety of sources including mistakes made during authoring or mastering of the video/audio content, conversions of the data streams from one data format or standard to another, and a difference in the lengths of the video and audio content, which introduces alignment errors when a presentation is switched from one program to another.

There are known methods for synchronizing audio and video data streams in a variety of contexts including the synchronization of streams that are conveyed in packets over networks such as IP networks. Many of these methods have been designed for use where network delays are unpredictable, packets of audio or video content are lost or received with errors, and competing network traffic is variable. Common approaches that are used to maintain synchronization between independent video and audio data streams include dropping or discarding packets of information from whichever data stream is behind the other, adjusting the speed of the processing clock for equipment that processes the data streams, and truncating processes that decode or recover data from received packets.

Unlike other applications for digital video and audio content, a digital cinema playback system should not drop or discard packets of video and audio content and the quality of the recovered video and audio content must kept at its highest level. Adjustment to the speed of processing clocks is either not possible in some implementations or is unattractive because it can introduce noticeable distortion in the presentations.

DISCLOSURE OF INVENTION

It is an object of the present invention to provide for synchronization of separate streams of video and audio data such that the video and audio data are complete.

According to one aspect of the present invention, audio content and video content of an audio/video program are synchronized by deriving timing information for sequences of video and audio packets that convey the video and audio content and by selectively delaying packets to achieve synchronization. A perceptual model is applied to this timing information to obtain a measure of perceived misalignment between the sequences of video and audio packets. If the measure of perceived misalignment indicates an audio packet is too early, the audio packet is delayed by an amount such that according to the perceptual model a perceived misalignment between the sequences of audio and video packets is reduced. If the measure of perceived misalignment indicates the audio packet is too late, both a video packet and the audio packet are delayed by respective amounts such that according to the perceptual model a perceived misalignment between the sequences of audio and video packets is reduced.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Figure 1:
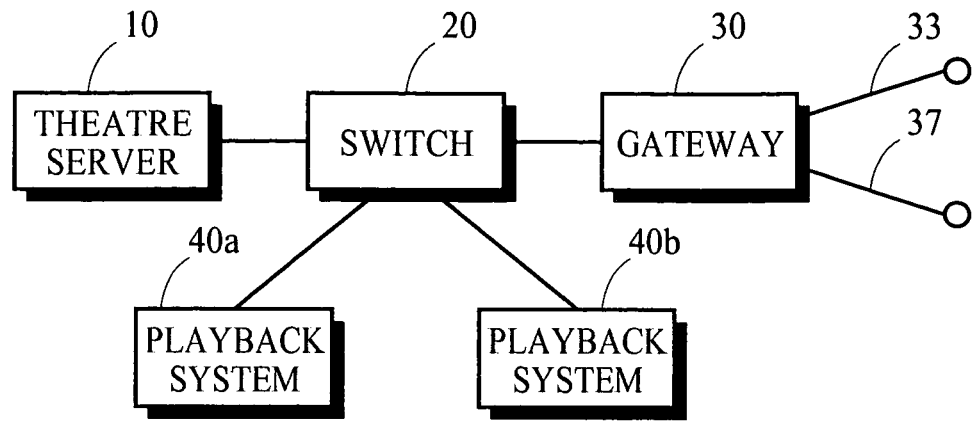
FIG. 1 is a schematic block diagram of a digital cinema network.

FIG. 1 illustrates a digital cinema network that has multiple playback systems. A typical system has a playback system for each auditorium in a digital cinema theatre complex; however, the network and equipment may be organized and installed in a wide variety of ways including, for example, multiple playback systems in a single auditorium with one or more screens. This latter arrangement allows multiple digital cinema programs to be presented simultaneously in one auditorium.

Referring to FIG. 1, a theatre management server 10, a gateway 30, and playback systems 40a, 40b are connected to one another by a network using a theatre network switch 20. Preferably, a Gigabit Ethernet or 1000BASE-T network is used. The theatre management server 10 performs a variety of services including administration and overall control of the playback systems 40a, 40b in the digital cinema network. The gateway 30 is optional and provides a communication link between the digital cinema network and one or more communication paths such as a satellite communication link 33 or a terrestrial wideband network 37. Alternatively, the gateway may be incorporated into the switch 20 to provide a single switch/gateway or router device. The communication paths may be used to deliver information such as cinema promotional material and digital cinema program decryption keys. Virtual private networking or similar functions may be provided to better protect sensitive information such as decryption keys.

In a preferred implementation of the digital cinema network, each playback system 40 is functionally independent of all other playback systems in the network. A respective playback system 40 may operate to provide a digital cinematic presentation without requiring services from equipment in any other playback system. The playback systems may be implemented in a variety of ways. One way is described below.

B. Playback System

Figure 2:
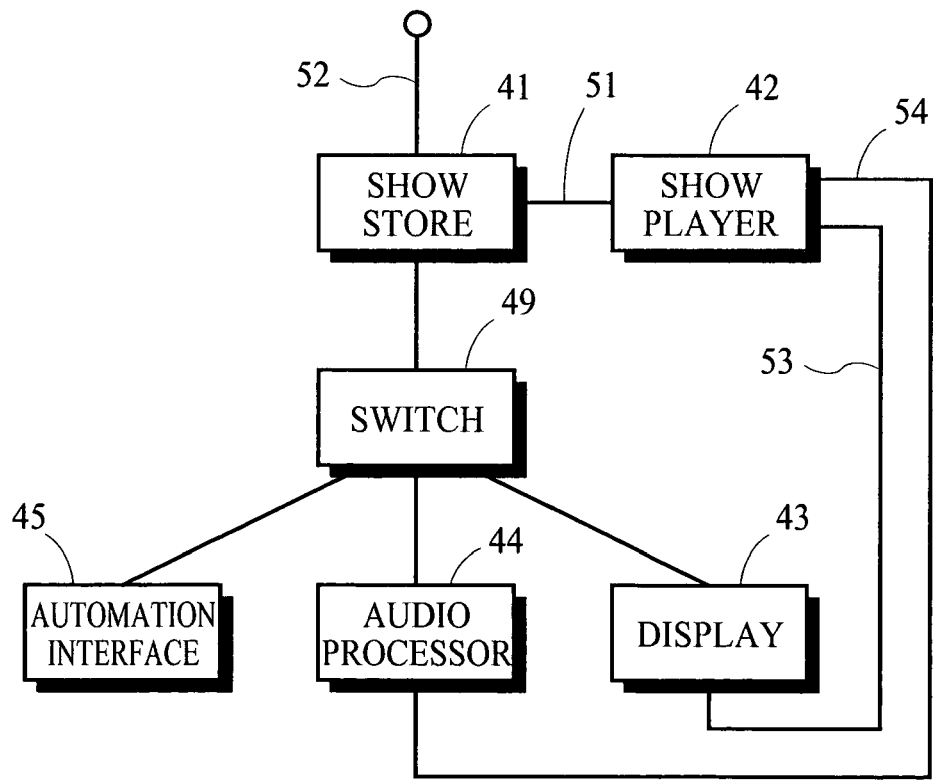
FIG. 2 is a schematic block diagram of a digital cinema playback system.

The schematic block diagram shown in FIG. 2 illustrates one implementation of a playback system 40 that includes a show store 41, a show player 42, a display 43, an audio processor 44, an automation interface 45, and a switch 49. The switch 49 provides network connections between all of these devices except the show player 42. Communication paths 51, 53, 54 directly connect the show player 42 to the show store 41, the display 43 and the audio processor 44, respectively.

The show store 41 is connected to the network switch 20 through communication path 52 and acts as a file server to receive and store one or more digital cinema programs. The show store 41 may store show configurations, show schedules, and information related to licensing, Digital Rights Management and encryption. In a preferred implementation, the show store 41 also acts as a Dynamic Host Configuration Protocol (DHCP) server to control the assignment of network IP address to devices in the playback system 40 and may implement Service Location Protocol (SLP) user and service agents to facilitate the provision of services within the playback system. DHCP and SLP are described in Internet Requests for Comments (RFC) 1541 and RFC 2165, respectively. The show store 41 extracts video and audio information from the stored programs, reformats the extracted information into encoded data streams, and provides the encoded data streams to the show player 42. Preferably, the encoded data streams are conveyed from the show store 41 to the show player 42 by a wideband communication path 51 such as a dedicated 1000BASE-T Ethernet path that connects directly between these two devices. In a typical implementation, the encoded representation conveys video information encoded according to some standard such as the MPEG-2 standard that is described in the International Standards Organization (ISO) Motion Picture Experts Group (MPEG) documents ISO/IEC 13818-1 through 13818-9, or the JPEG-2000 standard described in ISO/IEC 15444:2000, and conveys audio information that may be encoded as Pulse Code Modulation (PCM) data, MetaAudio Enhanced PCM data or data generated by an encoding process such as MetaAudio Dolby F. An example of a suitable show store 41 is the Dolby Show Store DSS100, available from Dolby Laboratories, San Francisco, Calif.

The show player 42 is a digital content decoder that decodes the encoded data streams to obtain digital video and digital audio information, which are provided to the display 43 and the audio processor 44, respectively, through communication paths 53, 54. The encoded representation may be encrypted. If it is encrypted, the show player 42 uses an appropriate video-content decryption key to decipher the video content. Preferably, a technique is used such as that described in the Federal Information Processing Standards (FIPS) Publication 197 with key generation and exchange provided by techniques such as those described in RSA Cryptography Standard PKCS #1 v2.1 or in the IEEE 1363-2000 standard. The show store 41 receives the appropriate video-content decryption key from the theatre management server 10, which may store this key and subsequently pass it to the show player 42 as needed or which may pass the key to the show player 42 without storing it.

In one implementation, the show store 41 receives an encrypted version of the video-content decryption key that was encrypted using a public key uniquely associated with the show player 42. The show player 42 deciphers the encrypted video-content decryption key using its own private key, uses the video-content decryption key to decipher and decode the video information as required and, if desired, encrypts the decoded video information for subsequent delivery to the display 43. The encryption may conform to some standard or other specification such as the proposed Society of Motion Picture and Television Engineers (SMPTE) DC28.4 standard or it may conform to proprietary processes that are compatible with the display 43. An example of a suitable show player 42 is the Dolby Show Player, DSP100, available from Dolby Laboratories, San Francisco, Calif.

The display 43 receives the decoded video information from the show player 42, deciphers the information if necessary, and presents the video information for viewing. The display may be essentially any device that is capable of presenting the video information such as a liquid crystal display (LCD) panel or a projector that can project an image onto a screen or other display medium. Preferably, the decoded video information is conveyed directly from the show player 42 to the display 43 by a wideband communication path 53 in a form that is compliant with the High Definition Serial Data Interface (HD-SDI) as described in the SMPTE 292M standard. An example of a suitable display 43 is the model DP 100 projector available from Barco N.V., Pres. Kennedypark 35, 8500 Kortrijk, Belgium.

The audio processor 44 receives the audio information from the show store 42, decodes the audio information if necessary, and applies filtering and equalization as desired to generate a signal that may be amplified for presentation to loudspeakers or other acoustic transducers. An example of a suitable audio processor 44 is the cinema sound processor model CP650, available from Dolby Laboratories, San Francisco, Calif. Preferably, the audio information is conveyed from the show player 42 to the audio processor 44 by a wideband communication path 54 that directly connects between these two devices and conforms to the SMPTE 276M standard.

The automation interface 45 generates signals in response to commands received through the switch 49 to control auditorium lighting, curtains and other components in a theatre automation system. An example of a suitable automation interface is the Network Automation Interface NA10, available from Dolby Laboratories, San Francisco, Calif.

The switch 49 switches traffic within the network of the playback system 40. In a preferred implementation, it supports a 1000 Mb/s or faster network such as a 1000BASE-T network.

C. Show Store

An implementation of the present invention described below is incorporated into the show player 42, which receives and processes encoded video and audio data. The video data conforms to the MPEG-2 standard mentioned above. The video and audio data are arranged in packets according to a Content Streaming Protocol (CSP). The show store 41 generates the CSP compliant data streams in response to data that it reads in data files that conform to the Material Exchange Format (MXF). The MXF is a proposed standard that is currently in process for acceptance by the SMPTE W25 Technology Committee for broadcast applications. If desired, aspects of the present invention may be incorporated into other devices or parts of the playback system. Principles of the present invention may be used to synchronize video and audio data streams that conform to other standards.

The CSP is used by the Dolby Show Store DSS100 mentioned above. The use of this protocol is not essential to the present invention but its use does provide data streams that can be processed by the Dolby Show Player DSP100, also mentioned above. Using the CSP, the show store 41 arranges video and audio data into packets. Each video packet has a data section conveying video data and a header section conveying control information including a Reel ID, a video Reel Frame Count, a video Frame Fractional Offset, a video frame Temporal Offset, and a video Frame Rate. Each audio packet has a data section conveying audio data and a header section conveying control information including a Reel ID, an audio Reel Frame Count, an audio Frame Fractional Offset, an audio Sample Rate, and an audio Frame Rate.

For the implementation described here, the show store 41 stores MXF files that are arranged in "track files." The data in each track file represents either the video content or the audio content of a "reel" of program material, which corresponds in principle to the visual or aural material conveyed by a conventional reel of film. A track file may represent all or part of a program such as a motion picture, for example. Typically, the data for a full-length motion picture is arranged into a set of multiple video track files and a set of multiple audio track files that are each played in sequence to generate video and audio data streams. As the show store 41 reads the track files, it generates packets of information in data streams that are compliant with the CSP. A video packet conveys video data for a respective video frame. An audio packet conveys audio data for a period of time that may correspond to a respective video frame or essentially any other period that may be desired.

The Reel ID and Reel Frame Count are generated by the show store 41. A unique Reel ID is generated for the packets that are generated from a respective pair of video and audio track files that are associated in time with one another. The Reel Frame Count represents the position of a respective frame within a track file in units of frames from the beginning of that track file. The other control information mentioned above, such as the Frame Fractional Offset, is obtained from the track files and inserted into the headers of the CSP compliant packets.

D. Show Player

Figure 3:
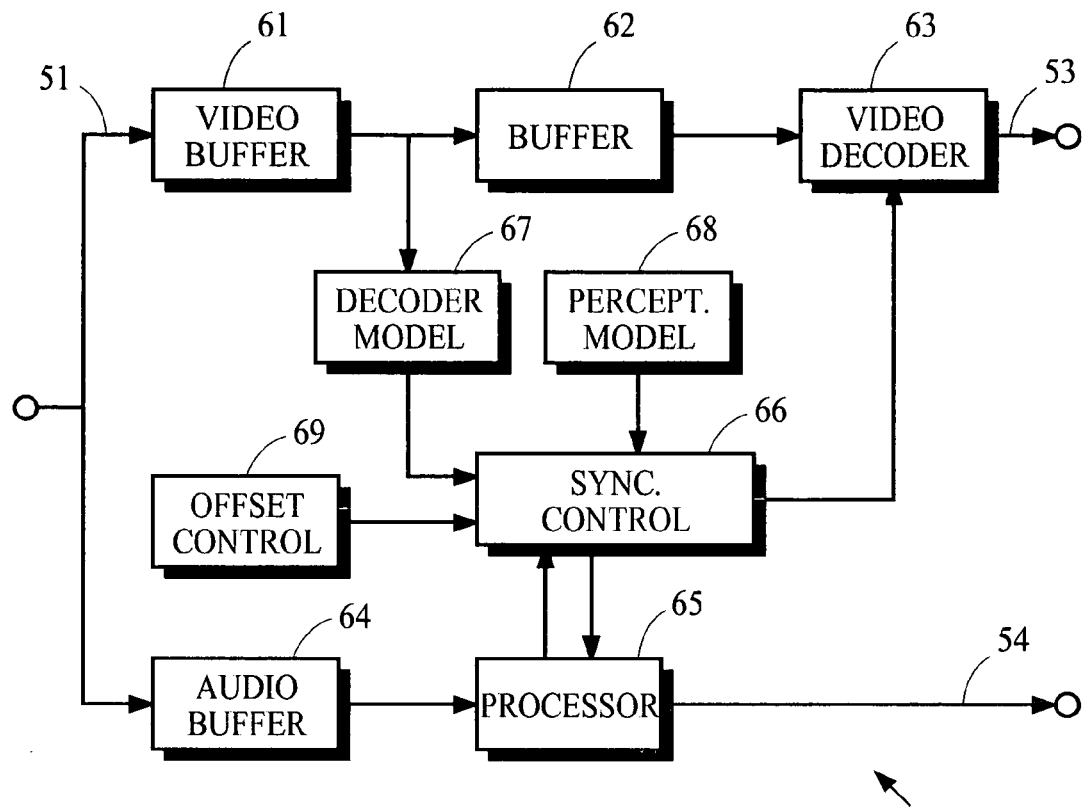
FIG. 3 is a schematic block diagram of a show player in a digital cinema playback system that includes components to maintain synchronization of video and audio data.

The schematic block diagram shown in FIG. 3 illustrates one implementation of the show player 42. The video buffer 61 receives and stores packets of video content that are conveyed in the CSP video data stream received through the communication path 51 from the show store 41. Conventional network protocols may be used to control the transfer of video packets from the show store 41 into the video buffer 61. The packets of video content stored in the video buffer 61 are subsequently passed to the video decoder 63 for decoding into decoded video frames that can be passed along the communication path 53 to the display 43 as described above. The encoded packets are passed to the video decoder 63 in synchronism with a clock that operates at a constant rate equal to the rate at which decoded frames are output by the video decoder 63. This rate is the video frame rate. The amount of encoded data that is conveyed in each packet is not constant. As a result, the bit rate or data rate of the encoded data that is passed to the video decoder 63 will vary.

The buffer 62 is optional and may be used advantageously in systems that are required to provide video data to the video decoder 63 at widely varying data rates. Its use can reduce implementation costs by allowing the video buffer 61 to be implemented by lower-cost memory circuits that are unable to deliver video data at the peak rates necessary to satisfy the demands of the video decoder 63. In this optional configuration, the video buffer 61 delivers video data to the buffer 62 at a rate that satisfies the average data-rate requirements of the video decoder 63. The buffer 62 stores enough video data so that it can deliver the largest possible packet of video content the video decoder 63 at the highest data rate needed to achieve the required frame rate for the highest possible picture quality.

The audio buffer 64 receives and stores packets of audio content that are conveyed in the CSP audio data stream received through the communication path 51 from the show store 41. Conventional network protocols may be used to control the transfer of audio packets from the show store 41 into the audio buffer 64. The packets of audio content stored in the audio buffer 64 are read by the processor 65 and passed along the communication path 54 to the audio processor 44 as described above.

The remaining components control the operation of the video decoder 63 and the processor 65 so that synchronization between the video and audio data can be achieved and maintained during playback.

E. Synchronization

1. Overview

As mentioned above, the implementation described here processes video and audio data that are packaged in CSP data streams that are generated from data stored in track files formatted according to the proposed MXF standard. Features that are unique to this particular implementation that are required for these particular coding standards are not essential features of the present invention.

Referring to FIG. 3, packets of encoded video data are read from the video buffer 61 at a constant rate in synchronism with a clock whose signals mark the beginning of video frame periods. The decoder model 67 analyzes information carried in the video packets as they are read from the video buffer 61 to obtain video timing information for those packets. This timing information, which is passed to the synchronization controller 66, indicates the time at which respective video packets will be output by the video decoder 63 as decoded video frames. One way in which this model can obtain video timing information is described below.

In principle, video timing information can be obtained by analyzing video packets essentially anywhere along the path from the show store 41 to the input of the display 43 but an arrangement that analyzes packets prior to their input to the decoder 63 is preferred because the relative alignment of the video and audio data streams can be adjusted more easily. The particular arrangement shown in the figure is attractive because the decoder model 67 can analyze data in the video packets as they pass to the buffer 62 at a relatively moderate data rate rather than having to analyze the data as it passes at widely varying rates, including much higher peak rates, that exist at the output side of the buffer 62.

Audio data also are read from the audio buffer 64 in synchronism with the video frame rate clock mentioned above. In many implementations the audio packets are not expected to be aligned with the video packets and they are read at a rate that does not equal the video frame rate. The processor 65 analyzes information carried in audio packets as they are read from the audio buffer 64 to obtain audio timing information. This timing information, which is passed to the synchronization controller 66, indicates the time at which respective audio packets will be output along the communication path 54. One way in which this processor can obtain audio timing information for the audio packets is described below.

The synchronization controller 66 receives the video timing information and the audio timing information from the decoder model 67 and the processor 65, respectively, and determines the relative alignment of the video and audio data streams at the beginning of each video frame. This information is passed to the perceptual model 68, which derives a measure of perceptibility for any timing misalignment or synchronization error between the two data streams. In response to the measure of perceptibility, the synchronization controller 66 adjusts the relative timing of video packets and/or audio packets to reduce any timing misalignment that is deemed to be perceptible. The way in which this is done is described below. Preferred implementations include an optional offset controller 69. In these implementations, the synchronization controller 66 accounts for any desired offset in timing alignment that is specified by the offset controller 69. For example, an offset may be desired to account for processing delays in the audio processor 44.

2. Perceptual Model

Errors in synchronization between the video and audio data streams will cause picture and sound to be out of step with one another. Depending on the magnitude of the error, this misalignment may be distracting to a viewer. There are many events that have visual and aural cues such as explosions, footsteps and speech. Synchronization errors in speech may be the most disturbing and are generally referred to as "lip-sync" errors. International Telecommunication Union (ITU) document ITU-R BT.1359-1 entitled "Relative Timing of Sound and Vision for Broadcasting" classifies synchronization errors as noticeable if they fall outside an interval defined by a "Threshold of Detectability" and classifies the errors as unacceptable if they fall outside an interval defined by a "Threshold of Acceptability." According to this document the interval defined by the Threshold of Detectability is from +45 ms to −125 ms and the interval defined by the Threshold of Acceptability is from +90 ms to −190 ms, where positive numbers indicate audio precedes video.

In one implementation, the perceptual model 68 provides a measure of perceived misalignment that has three values. One value, such as zero, indicates that the timing misalignment, if any, is within the interval defined by the Threshold of Detectability. A second value, such as positive one, indicates audio precedes video by an amount that falls outside the interval defined by the Threshold of Detectability. A third value, such as negative one, indicates video precedes audio by an amount that falls outside the interval defined by the Threshold of Detectability. A wide range of models may be used.

3. Video Timing (Video Decoder Model)

In synchronism with the video frame clock mentioned above, the decoder model 67 derives video timing information for a respective video packet for each video frame period.

Video timing information is obtained by applying the decoder model 67 to information carried in the video packets. This timing information for a respective video packet indicates the time at which the video data decoded from that respective video packet will be output by the video decoder 63. One way in which video timing information can be obtained from video packets that are formatted according to the CSP mentioned above is described in the following paragraphs.

Each video packet in a CSP compliant video data stream has a header section with control information and a data section with data representing the image in a frame or picture of a visual program. The header of a respective packet includes a decode-order video Reel Frame Count, which increases by one for each successive video packet in the data stream for a respective track file, a video Frame Rate and a video Frame Fractional Offset from which video timing information may be derived. A Decoding Time Stamp (DTS) is obtained from calculations that may be expressed as $$DTS = \frac{\left(\begin{array}{c}\text{video Reel Frame Count} - \\ \text{video Frame Fractional Offset}\end{array}\right)}{\text{video Frame Rate}}$$

The DTS represents the order or relative time at which the data conveyed in the respective packet is to be decoded and output by the video decoder 63. The order in which packets are decoded is not necessarily the order in which the corresponding decoded data is output by the decoder, which may be referred to as the presentation order.

The relative timing for each packet in presentation order, or the video presentation time (VPT), may be derived from the DTS and a video frame Temporal Offset (TO) value that is also carried in the video packet header. One way that this may be done is explained below.

Each video packet is classified as one of three types commonly referred to as I, P and B packets, which indicate how the video data in the packet was encoded and how it is to be decoded. An I packet conveys data that was encoded independently of all other frames in a video program and, therefore, can be decoded independently of all other packets in the video data stream. A P packet conveys data that was encoded using values predicted from a preceding frame in a video program and cannot be decoded without having decoded the packet that corresponds to that preceding frame. For example, a P packet may depend on an immediately preceding I packet, or it may depend on a P packet, which in turn is dependent directly or indirectly on an I packet. A B packet conveys data that was encoded using values predicted from a following frame and possibly from a preceding frame in a video data stream and cannot be decoded without having decoded the packets that correspond to those preceding and following frames.

One example of a sequence of packets in a video data stream is represented by the information shown in Table I.

TABLE I

| | Type | | | | | | |
|---|---|---|---|---|---|---|---|
| | I | P | B | B | P | B | B |
| DTS | 1 | 2 | 3 | 4 | 5 | 6 | 7 |
| TO | 0 | 2 | −1 | −1 | 2 | −1 | −1 |
| VPT | 1 | 4 | 2 | 3 | 7 | 5 | 6 |

The packets in this sequence are shown in decode order, as expressed by the values of the DTS. The adjustment needed to derive the VPT from the DTS is expressed by the TO values. This derivation may be expressed as $$VPT = DTS + \frac{TO}{\text{video Frame Rate}} = DTS + (TO \cdot \text{video frame period})$$

For example, the VPT for the second packet, which is of type P, is DTS+TO=2+2=4. The VPT for the third packet, which is of type B, is DTS+TO=3+(−1)=2.

For the examples shown here, the values for DTS are arbitrary chosen to be integers and the video frame rate is arbitrary chosen to be equal to one to simplify the discussion.

The VPT of these packets indicates the presentation order of the frames that will be decoded from these packets. The presentation order of the frames is $I_1 B_3 B_4 P_2 B_6 B_7 P_5$ where the subscript of each element in the sequence is the DTS of the corresponding packet.

Encoded video packets in an MPEG-2 compliant video data stream are arranged in a Group of Pictures (GOP) that begin with an I packet. For example, the sequence of packets shown in Table I in decode order could be one GOP. Although each GOP in decode order begins with an I packet, the I packet does not necessarily correspond to the first frame of a GOP that will be output by the video decoder. This can be seen by another example of a sequence of packets that could be a GOP, which is represented by the information shown in Table II.

TABLE II

| | Type | | | | | |
|---|---|---|---|---|---|---|
| | I | B | B | P | B | B |
| DTS | 1 | 2 | 3 | 4 | 5 | 6 |
| TO | 2 | −1 | −1 | 2 | −1 | −1 |
| VPT | 3 | 1 | 2 | 6 | 4 | 5 |

The packets in this sequence are also shown in decode order. The VPT is derived from the DTS and TO in the same manner as discussed above. In this example, the first B packet may be dependent on a packet in the preceding GOP.

The VPT of these packets indicates the presentation order of the frames that will be decoded from these packets is $B_2 B_3 I_1 B_5 B_6 P_4$ where the subscript of each element in the sequence is the DTS of the corresponding packet.

If time $T_1$ is the time the first packet in a GOP is input to a video decoder and time $T_2$ is the time the first frame of decoded data is output for that GOP, then the interval $(T_2-T_1)$ between these two times is a constant that may be referred to as the decoding latency of that decoder. The decoding latency of individual frames within a GOP is not a constant because of a reordering of frames that takes place in the video decoder 63. The decoder model 67 derives the VPT of the frames that are output by the video decoder 63 from the DTS of the packets entering the decoder. In one implementation, the decoder model 67 calculates the VPT from the DTS as described above and accounts for buffer delays in the buffer 62, the decoding latency, and the frame reordering that occurs in the video decoder 63. This implementation of the model is able to determine correct VPT values even for abnormal situations such as playback commencing part way through a GOP, for example, because the model accounts for the actual operation of the video decoder 63.

In another implementation, the decoder model 67 uses a first-in-first-out (FIFO) buffer having a length that accounts for delays in the buffer 62 and the video decoder 63. As a video packet is passed to the buffer 62, the associated DTS value is pushed into the FIFO. As a video frame is output by the video decoder 63, a time value is read from the FIFO as the VPT for that frame. This implementation is computationally less complex than the implementation described above but it cannot determine the correct VPT for abnormal situations such as the commencement of playback part way through a GOP.

With either implementation, the VPT represents the time at which a decoded video frame from a respective video packet is output from the video decoder 63 for presentation by the display 43.

4. Audio Timing

Each audio packet in a CSP compliant audio data stream has a header section with control information and a data section with data representing a frame of audio samples. The data section may convey PCM data representing individual samples in the frame or it may convey a set of data representing a frame of audio samples that have been encoded using some block-encoding process such as transform coding or block scaling. The number of samples in an audio frame that are represented by a packet is specified by information in the packet header. Typically, the header specifies the audio Sample Rate and the audio Frame Rate. The number of samples in an audio frame may be calculated by dividing the audio Sample Rate by the audio Frame Rate.

The header section also includes control information from which an audio presentation time (APT) may be derived. One way in which audio timing information can be obtained from audio packets conforming to the CSP is described in the following paragraphs.

The header of a respective packet includes an audio Reel Frame Count, which increases by one for each successive packet in the data stream for a respective track file. The relative timing for the beginning of each packet in presentation order, or the audio frame time (AFT), is obtained from calculations that may be expressed as $$AFT = \frac{\left(\begin{array}{c}\text{audio Reel Frame Count} - \\ \text{audio Frame Fractional Offset}\end{array}\right)}{\text{audio Frame Rate}}$$

The processor 65 determines the AFT for each audio frame that corresponds to an audio packet as that packet is read from the audio buffer 64. In synchronism with the video frame clock mentioned above, the processor 65 determines an Audio Presentation Time (APT) for the sample period in the audio data stream that is most closely aligned with the beginning of the current video frame period. In typical situations, this alignment location does not coincide with the beginning of an audio frame but, instead, occurs somewhere within a frame. In these situations, timing information for the alignment location is obtained by extrapolation from the AFT for the beginning of the frame in which the alignment location occurs. This extrapolation may be performed in a variety of ways. One way may be expressed as $$APT = AFT + \frac{K}{\text{audio sample rate}}$$

where K=number of sample periods between the beginning of the audio frame and the beginning of the current video frame.

5. Synchronization Control

The synchronization controller 66 is responsible for achieving and maintaining synchronization between the video and audio data streams. The following discussion describes how principles of the present invention may be used to maintain synchronization during playback; however, these same principles may be used to achieve synchronization at the start of playback. If desired, initial synchronization at the start of playback may also be achieved using essentially any known synchronization technique.

The relative alignment of video and audio data streams is monitored and adjusted as needed to maintain synchronization within desired limits by delaying the processing of video packets and audio packets. In one implementation, the processing of video packets is delayed by suspending the reading of video data from the video buffer 61 for an integer number of video frame periods and the processing of audio data is delayed by suspending the reading of audio data from the audio buffer 64 for a specified period that may be equal to an integer number of audio sample periods or an integer number of audio frame periods.

For each video frame, the synchronization controller 66 obtains video timing information for the current video frame and audio timing information for the location in the audio data stream that is actually aligned with the beginning of the video frame. This timing information is passed to the perceptual model 68, which determines whether any misalignment between the two data streams is deemed to be perceptible. In one implementation, this is accomplished by determining whether the difference between video and audio times falls outside the interval defined the ITU Threshold of Detectability mentioned above.

If the perceptual model 68 indicates there is no perceptible misalignment, normal processing of the two data streams continues by reading video data from the video buffer 61 and passing it to the video decoder 63 and by reading audio data from the audio buffer 64 and passing it along the communication path 54 to the audio processor 44.

If the audio and video times indicate the audio data stream is ahead of the video data stream and the perceptual model 68 indicates the misalignment between data streams is perceptible, normal processing of the video data stream continues but the synchronization controller 66 instructs the processor 65 to delay processing of the audio data stream for a specified interval $D_A$, which is either an integer multiple of the audio frame period or an integer multiple of the audio sample period. One way to determine the duration DA of this interval may be expressed as $$D_A = \left\lceil \frac{APT - VPT}{P_A} \right\rceil \cdot P_A$$

where VPT=presentation time of the current video frame;
APT=presentation time of the current audio sample;
$P_A$=audio frame period or audio sample period as desired; and
⌈x⌉=smallest integer that is greater than or equal to x.

During this interval, the processor 65 inserts data such as zero-valued samples or the value of the previous sample into the audio data stream that is passed along the path 54. If the audio packets convey data that was generated by a block-encoding process, preferably zero-valued data is inserted ahead of the next audio packet that is read from the audio buffer 64. In this implementation, the audio processor 44 may respond to the inserted data by muting its output or by repeating a previous sample. The amplitude of the audio following the muted interval may be gradually increased from a very low level toward a normal level of desired. If either the show player 42 or the audio processor 44 can be informed of a delay before it outputs audio samples that precede the delay, the amplitude of the audio ahead of the muted interval may be gradually diminished toward a very low level if desired.

If the video and audio times indicate the video data stream is ahead of the audio data stream and the perceptual model 68 indicates the misalignment between data streams is perceptible, the synchronization controller 66 instructs the video decoder 63 to delay processing of the video data stream for a specified interval $D_V$, which is an integer multiple of the video frame period, and it instructs the processor 65 to delay processing of the audio data stream for a specified interval $D_A$, which is either an integer multiple of the audio frame period or an integer multiple of the audio sample period as explained above. One way to determine the durations of the two intervals may be expressed as $$D_V = \left\lceil \frac{VPT - APT}{P_V} \right\rceil \cdot P_V$$

$$D_A = \left\lceil \frac{D_V - (VPT - APT)}{P_A} \right\rceil \cdot P_A$$

where $P_V$=video frame period.

During the interval $D_V$, the video decoder 63 inserts data for one or more video frames into the video data stream that is passed along the path 53. These inserted frames may be a repetition of a previous video frame or it may represent any arbitrary image such as a image with no luminance, typically called a black frame. During the interval $D_A$, the processor 65 inserts data such as zero-valued samples into the audio data stream that is passed along the path 54 as described above.

In typical implementations, the video frame period is approximately 40 ms and the audio sample period is approximately 20 us. Adjustments to the alignment of the audio data stream typically can be done much in finer increments than can be done for the video data stream.

Adjustments to the relative alignment may also be triggered by a change in the source material conveyed in the data streams such as a transition from a promotional trailer to a main cinematic feature, by a change in the video or audio frame rates or audio sampling rates, or a change in an offset specified by an operator.

Whenever a switch occurs from one track file to the beginning of another track file, one implementation of the show store 41 generates a different Reel ID and resets the initial Frame Count to zero for the packets generated from the new track file. In some instances, the show store 41 may switch between video track files and audio track files at different times. In this situation, a preferred implementation of the show player 42 suspends making any changes in alignment until packets in both data streams have matching Reel IDs.

F. Implementation

Figure 4:
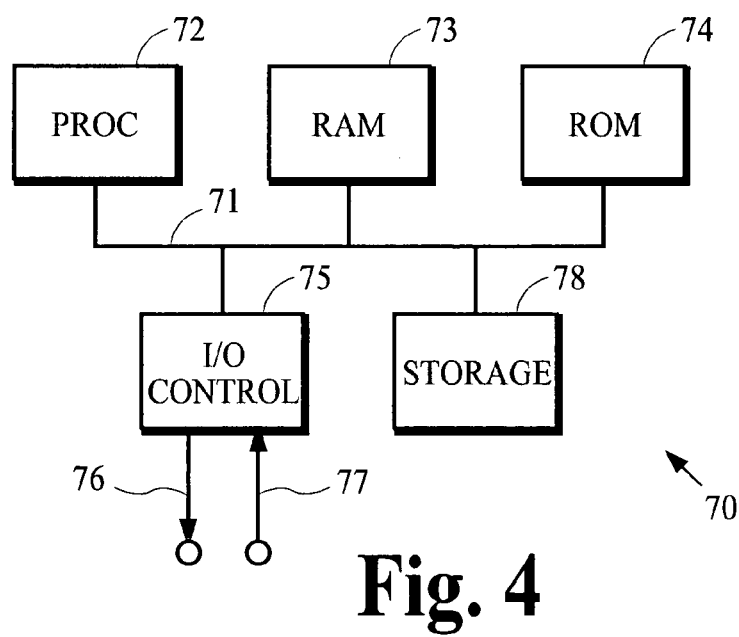
FIG. 4 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 4 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention. Preferably, the computer system is tolerant to hardware failures. One way in which this may be done is to provide redundant components such as dual power supplies and redundant storage devices, and to use an operating system that is capable of detecting and reacting to faults.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method for processing audio content and video content of an audio and video program, wherein the method comprises:

receiving a sequence of audio packets conveying first control information and the audio content and obtaining from the first control information audio time information for a respective audio packet in the sequence of audio packets;

receiving a sequence of video packets conveying second control information and the video content and obtaining from the second control information video time information for a respective video packet in the sequence of video packets;

determining from the audio time information and the video time information a relative time alignment of the respective audio packet with the respective video packet and applying a perceptual model to the relative time alignment to obtain a measure of perceived misalignment between the respective audio packet and the respective video packet;

if the measure of perceived misalignment indicates the respective audio packet precedes the desired time alignment with the respective video packet by an interval that exceeds a first threshold, delaying all or part of the respective audio packet by a first amount such that according to the perceptual model a perceived misalignment between the delayed respective audio packet and the respective video packet is reduced; and if the measure of perceived misalignment indicates the respective audio packet follows the desired time alignment with the respective audio packet by an interval that exceeds a second threshold, delaying the respective video packet by a second amount and delaying all or part of the respective audio packet by a third amount such that according to the perceptual model a perceived misalignment between the delayed respective audio packet and the delayed respective video packet is reduced.

2. The method according to claim 1 wherein:

data conveyed in a respective audio packet represents an interval of aural information having an audio frame period and data conveyed in a respective video packet represents an interval of visual information having a video frame period;

the first amount is equal to an integer number of the audio frame periods;
the second amount is equal to an integer number of video frame periods; and
the third amount is equal to an integer number of audio frame periods.

3. The method according to claim 1 wherein:
data conveyed in a respective audio packet represents a plurality of samples each having an audio sample period and data conveyed in a respective video packet represents an interval of visual information having a video frame period;
the first amount is equal to an integer number of the audio sample periods;
the second amount is equal to an integer number of video frame periods; and
the third amount is equal to an integer number of audio sample periods.

4. The method according to claim 1 that comprises obtaining the audio time information by extrapolation from first control information that conveys timing for the beginning of the respective audio packet.

5. The method according to claim 1 that comprises:
inserting information into an audio data stream that is generated from all or part of the respective audio packet that is delayed; and
reducing playback levels of audio content preceding the inserted information and increasing playback levels of audio content following the inserted information.

6. The method according to claim 1 wherein:
the sequence of audio packets and the sequence of video patents is received from a communications network and stored in one or more buffers in a device; and
a protocol used to control communication in the network is used to control storage of information in the one or more buffers.

7. The method according to claim 1 that determines the first amount, the second amount and the third amount so that the perceived misalignment is reduced to such an extent that it is not perceptible according to the perceptual model.

8. A medium conveying a program of instructions that is executable by a device to perform a method for processing audio content and video content of an audio and video program, wherein the method comprises:
receiving a sequence of audio packets conveying first control information and the audio content and obtaining from the first control information audio time information for a respective audio packet in the sequence of audio packets;
receiving a sequence of video packets conveying second control information and the video content and obtaining from the second control information video time information for a respective video packet in the sequence of video packets;
determining from the audio time information and the video time information a relative time alignment of the respective audio packet with the respective video packet and applying a perceptual model to the relative time alignment to obtain a measure of perceived misalignment between the respective audio packet and the respective video packet;
if the measure of perceived misalignment indicates the respective audio packet precedes the desired time alignment with the respective video packet by an interval that exceeds a first threshold, delaying all or part of the respective audio packet by a first amount such that according to the perceptual model a perceived misalignment between the delayed respective audio packet and the respective video packet is reduced; and
if the measure of perceived misalignment indicates the respective audio packet follows the desired time alignment with the respective audio packet by an interval that exceeds a second threshold, delaying the respective video packet by a second amount and delaying all or part of the respective audio packet by a third amount such that according to the perceptual model a perceived misalignment between the delayed respective audio packet and the delayed respective video packet is reduced wherein the medium is mgnetic tape, cards or disks, or optical cards or disc.

9. The medium according to claim 8 wherein:
data conveyed in a respective audio packet represents an interval of aural information having an audio frame period and data conveyed in a respective video packet represents an interval of visual information having a video frame period;
the first amount is equal to an integer number of the audio frame periods;
the second amount is equal to an integer number of video frame periods; and
the third amount is equal to an integer number of audio frame periods.

10. The medium according to claim 8 wherein:
data conveyed in a respective audio packet represents a plurality of samples each having an audio sample period and data conveyed in a respective video packet represents an interval of visual information having a video frame period;
the first amount is equal to an integer number of the audio sample periods;
the second amount is equal to an integer number of video frame periods; and
the third amount is equal to an integer number of audio sample periods.

11. The medium according to claim 8 wherein the method comprises obtaining the audio time information by extrapolation from first control information that conveys timing for the beginning of the respective audio packet.

12. The medium according to claim 8 wherein the method comprises:
inserting information into an audio data stream that is generated from all or part of the respective audio packet that is delayed; and
reducing playback levels of audio content preceding the inserted information and increasing playback levels of audio content following the inserted information.

13. The medium according to claim 8 wherein:
the sequence of audio packets and the sequence of video patents is received from a communications network and stored in one or more buffers in the device; and
a protocol used to control communication in the network is used to control storage of information in the one or more buffers.

14. The medium according to claim 8 wherein the method determines the first amount, the second amount and the third amount so that the perceived misalignment is reduced to such an extent that it is not perceptible according to the perceptual model.

* * * * *